March 30, 1937.  G. DIRR  2,075,603

MEAT GRINDER AND CUTTING KNIFE THEREFOR

Filed Sept. 15, 1934

INVENTOR.
GEORGE DIRR.
BY
ATTORNEYS.

Patented Mar. 30, 1937

2,075,603

UNITED STATES PATENT OFFICE 2,075,603

MEAT GRINDER AND CUTTING KNIFE THEREFOR

George Dirr, Cincinnati, Ohio

Application September 15, 1934, Serial No. 744,230

3 Claims. (Cl. 146—187)

My invention relates to improvements in meat grinders or cutters in which meat is fed along by a screw conveyor through a tubular casing and is forced through a perforated plate against which a rotating knife bears which cuts off the meat as it emerges from the perforations in the plate. My invention further relates to a novel type of cutter knife for use with a meat grinder of the character described. In meat grinding or cutting such as is required for the manufacture of various kinds of sausage, such for example as summer sausage, the speed with which the meat is ground or cut becomes of considerable importance both from the point of view of the capacity of a given unit and then because if the grinder does not operate rapidly, friction causes the meat to heat up and the product made from the ground meat is consequently much more susceptible to souring and rancidity.

It is particularly the object of my invention to provide a cutter knife which will expedite the cutting and movement of ground meat between a set of perforated plates and which, because of the speed with which it operates, will prevent undue overheating of the meat during the grinding operation.

Another objection of my invention is the provision of an extension for a meat grinder which may be secured in the regular threads with which the grinder cap is ordinarily secured to the grinder and which would also be provided with external threads which will permit the cap to be inserted after the extension member has been screwed into position and in which the extension and cap combined will provide space for retaining an auxiliary perforated plate and the novel type of cutter knife to which I have referred.

The above objects and other objects to which reference will be made in the ensuing disclosure, I accomplish by that certain combination and arrangement of parts of which I have shown a preferred embodiment.

Referring to the drawing.

Figure 1:
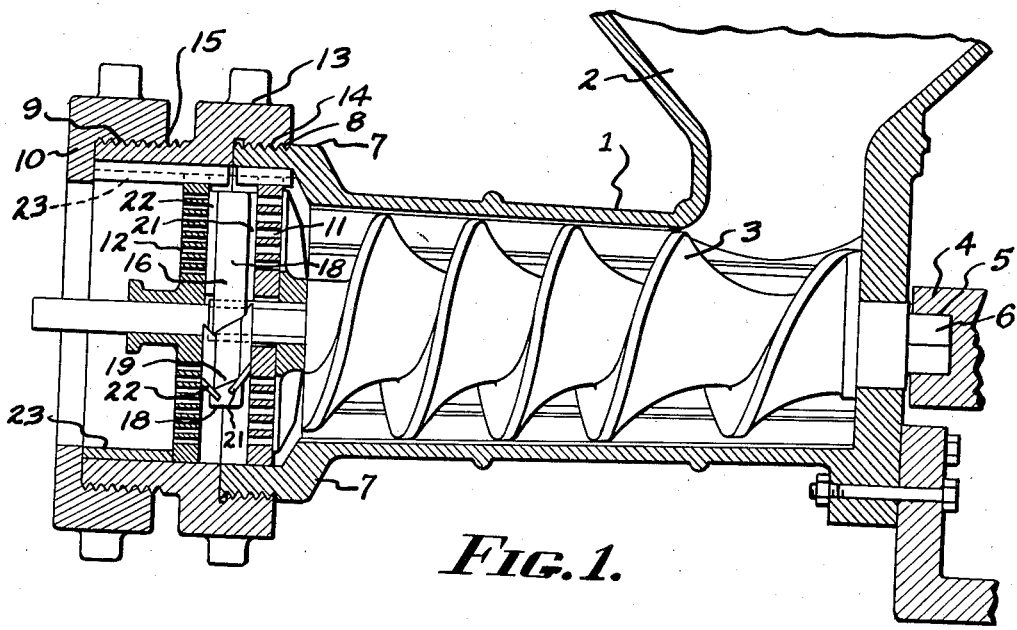
Figure 1 is a side vertical sectional view of a meat grinder showing the extension and cutter knife which forms the principal subject matter of my invention.
Figures 2, 3:
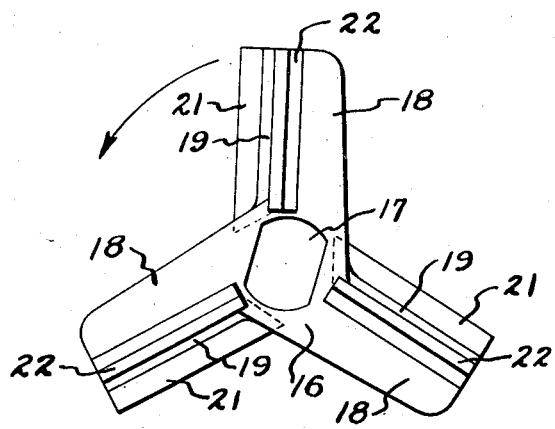
Figure 2 is a side elevation of my preferred type of extension.
Figure 3 is an end elevation of my preferred type of double bladed knife.
Figure 4:
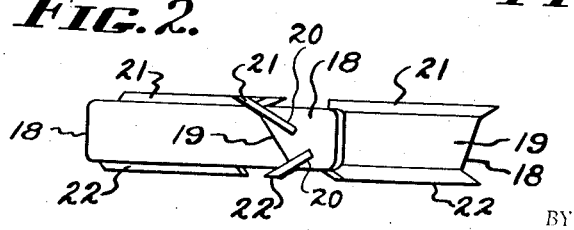
Figure 4 is an end elevation of one of the cutter knife arms showing the cutting blades mounted therein.

Referring to Figure 1, I have shown the tubular grinder casing 1 with the hopper 2 through which meat is fed to the screw 3, which is rotated either manually or by a motor connected to the shaft 4 which has the slot 5 which is engaged by a projection 6 at the driving end of the shaft of the screw 3.

The tubular casing has an enlarged discharge end 7 provided with threads 8 which ordinarily are engaged by the internal threads 9 of a cap member indicated at 10.

Thousands of meat grinders are sold every year of this type. In the usual type grinding machine, there is a perforated plate such as the plate indicated at 11 and a discharge perforated plate such as that indicated at 12. A cutter knife ordinarily is mounted between the two plates.

My invention consists in the provision of an extension 13 having internal threads 14 which engage the threads 8 of the grinder casing. The extension is provided with external threads 15 which are engaged by the internal threads of the cap member 10. It will be noted that the threads 8 and 15 are the same size so that the extension can be added to the usual type of meat grinder.

My novel type of knife generally indicated at 16 has a hub provided with a square opening 17 which engages a square portion of the shaft of the screw 3. From the hub of my novel cutter knife, arms 18 are extended regularly and the peripheral surface of the arms is inclined as indicated at 19 in the direction of movement of the meat. The arms have slots 20 within which cutter knives 21, 22 are secured.

It will be noted that the knife 21 which extends up to the right as indicated in Figure 1 has a cutting face which bears against the surface of the perforated plate 11 and that the knife 22 extends up to the left as illustrated in Figure 1 and has a cutting face which bears against the surface of the perforated plate 12. The peripheral surface of the spider arm is inclined in the direction face of the feed of the meat so that with the rotation of the knife the ground meat is fed along from the inlet perforated plate to the discharge perforated plate.

To hold the discharge perforated plate in position on the shaft of the screw, I have provided a filler ring 23 which it will be noted in Figure 1 bears against the annular edge of the discharge perforated plate.

By the use of my extension head and the double bladed cutting knife, I am able to almost double the capacity of the grinder and at the same time any heating up due to friction is avoided so that the ground meat after packing has little or no tendency to sour or turn rancid.

Having thus described my invention, what I claim as new and desire to secure by Letters Patent, is:

1. In a meat grinder having a plurality of stationary perforated plates through which the meat is forced, a rotary cutter knife mounted for rotation between a pair of said plates comprising a hub having a plurality of blade holding arms extending from said hub, and pairs of blades mounted on each of said arms, one of said blades extending out beyond said holding arms and transversely to the axis of said hub with its cutting face engaging one of said plates, the other blade extending out beyond said holding arms and transversely with its cutting face engaging the other of said plates, and the peripheral surfaces of said arms spaced away from the cutting face of said blades and inclined so as to form a pocket between said blades and to advance cut meat in the direction of its feeding movement.

2. In a meat grinder having a plurality of stationary perforated plates through which the meat is forced, a rotary cutter knife mounted for rotation between a pair of said plates comprising a hub having a plurality of blade-holding arms extending from said hub, a pair of blades mounted on each of said arms, one of said blades extending out transversely to the axis of said hub with its cutting edge forward in the direction of rotation and with its cutting face engaging one of said plates, the other blade extending out transversely with its cutting edge forward in the direction of rotation and with its cutting face engaging the other of said plates, the cutting edge of the first blade in relation with the direction of the feed of the meat in advance of the cutting edge of the last blade, and the peripheral surface of said arms spaced away from said cutting edges to form a pocket and inclined so as to advance cut meat in the direction of its feeding movement.

3. In a meat grinder having a first and a second stationary perforated plate in relation to the direction of feed of the meat and through which the meat is forced, a rotary cutter knife mounted for rotation between said plates and comprising a hub having a plurality of blade-holding arms extending from said hub, pairs of blades mounted on each of said arms, one of said blades extending out transversely to the axis of said hub with its cutting edge forward in the direction of rotation and with its cutting face engaging said first perforated plate, the other blade extending out transversely with its cutting edge forward and with its cutting face engaging said second perforated plate, the cutting edge of said blade engaging said first plate being in advance of the cutting edge of the blade engaging said second plate, and the peripheral surfaces joining said blades of said arms inclined so as to be substantially parallel with and spaced back from a plane through the cutting edges of both blades.

GEORGE DIRR.